United States Patent [19]
Dorsey

[11] 3,903,637
[45] Sept. 9, 1975

[54] COLLAPSIBLE TRAP
[75] Inventor: Lewis Dorsey, Bronx, N.Y.
[73] Assignee: Robert Alan Dorsey, Scarsdale, N.Y.
[22] Filed: Dec. 11, 1974
[21] Appl. No.: 531,640

[52] U.S. Cl. ................................................. 43/105
[51] Int. Cl.² ........................................ A01K 69/10
[58] Field of Search .......... 43/102, 105, 100, 63, 12

[56] References Cited
UNITED STATES PATENTS
| | | | |
|---|---|---|---|
| 1,262,507 | 4/1918 | Johnston | 43/105 |
| 2,603,031 | 7/1952 | Haseman | 43/105 |

*Primary Examiner*—Warner H. Camp
*Attorney, Agent, or Firm*—Burgess, Dinklage & Sprung

[57] ABSTRACT

A collapsible trap especially for shell fish such as crabs is disclosed. The trap includes a base and an arcuate member extending across the base and pivotably mounted thereon. Two frame members, preferably two pairs of frame members, carrying a flexible net extend across the base generally at right-angles to the arcuate member and are also pivotably mounted on the base. The arcuate member and the frame members lie flat with the base when the trap is open with the frame members lying flat on opposite sides of the base. An actuation device, such as a pull rope with two ends, one each attached to the opposite frame members, is adapted to cause the arcuate member to pivot to an upright position and the net and frame members to pivot upwards from the base towards each other over the upright arcuate member and thereby form a trap enclosure with the base.

5 Claims, 3 Drawing Figures

PATENTED SEP 9 1975  3,903,637

COLLAPSIBLE TRAP

BACKGROUND

This invention relates to a collapsible trap, especially for crabs, which is capable of lying flat in an open and baited condition, thereby providing unencumbered access to the bait for the intended quarry.

In the past, collapsible traps, for example crab traps, have been provided with a rigid center post from which a pull rope extends to the folded down net portion of the trap. The traps shown in U.S. Pat. No. 1,188,185 to Krulish, U.S. Pat. No. 2,603,031 to Haseman and 3,553,881 to Hasseman are typical of such traps. The pull rope as associated with the fixed upright center post is used to erect the net portion of the trap to form a trap enclosure. However, in the open and baited condition, such traps provide encumbered access to the bait by reason of the rigid fixed center post and the pull ropes dangling down therefrom to the sides of the trap.

The present invention overcomes these and other difficulties encountered with collapsible traps, especially crab traps and provides a trap which is capable of lying entirely flat in the open and baited position. Because the trap of the invention lies entirely flat in the open and baited position, it will not tumble or roll with the tide. In addition, the trap of the invention will open flat regardless of how thrown or where it lands in the water. The trap of the invention can also be thrown from shore with the assurance that it will assume an open, flat baited position when it comes to rest on the bottom of the water.

SUMMARY

The collapsible trap of the invention includes a base, arcuate means extending across the base and pivotably mounted thereon, two frame means, preferably each including a pair of frame members, each carrying net means extending across the base at generally right-angles to the arcuate means and also being pivotably mounted on the base, said arcuate means and said frame means being adapted to lie flat with the base when the trap is open, said frame means lying flat on opposite sides of the base, and actuation means, preferably a pull rope having two ends, one each attached to each of the frame means, adapted to cause the arcuate means to pivot to an upright position and the net and frame means to pivot upwards from the base towards each other over the upright arcuate means thereby forming a trap enclosure with a base.

In a preferred embodiment, the base is generally circular and the arcuate and frame means are semicircular in shape and generally conform to the outline of the base when lying flat thereon.

DESCRIPTION OF THE DRAWING

The present invention will be more fully understood from the following description taken in conjunction with the accompanying drawing wherein.

DESCRIPTION

Figure 1:
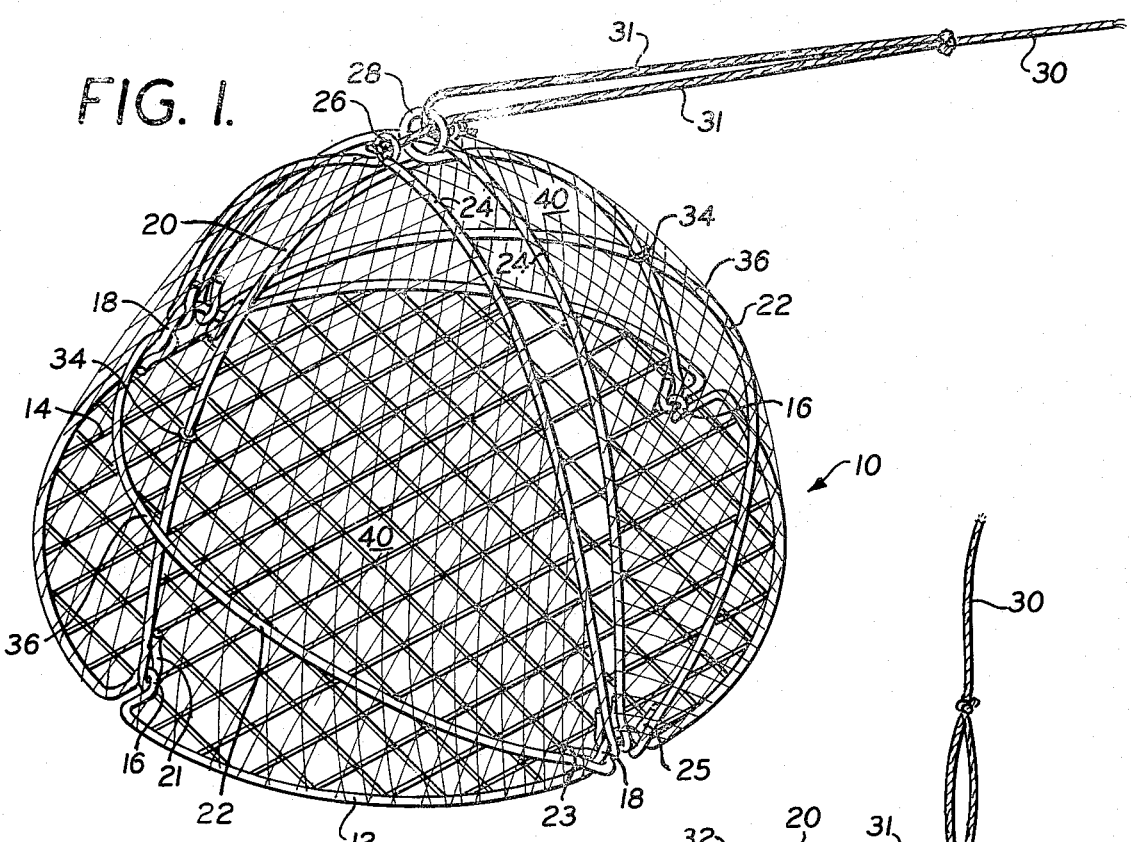
FIG. 1 is a perspective view of the trap of the invention shown erected so as to form a trap enclosure.

The collapsible trap of the invention, which is especially suited for trapping crabs, can be characterized as a "platter trap" by virtue of its flat profile when in the open and baited position. Other unique and desirable features of the trap of the invention include 100% visibility with respect to the bait in the water, no obstructions which would otherwise impede or retard a crab's approach to the bait in the trap and its light-weight and construction. In addition, the trap of the invention is ready for use on purchase and thereafter and no tools are necessary to assemble or otherwise ready the trap for use. The trap can also be stored and carrried flat and is generally simple to prepare for catching crabs.

Referring now to the drawing, the trap of the invention is shown to include a base 10 which is preferably made of a circular frame member 12 and an open or perforate mesh member 14. Integrally formed with the frame member 12 are pivot points 16 and 18. Arcuate or arch member 20 extends across the base 10 and is pivoted via integral loops 21 at points 16 on the base.

The preferred frame means includes two pairs of frame members 22 and 24 which carry the flexible and foldable net 40 and extend across the base 10, generally at right-angles to the arcuate member 20 and are also pivotably mounted to the base via end portions 23 and 25 which pivot at point 18 on the base 10.

Figure 3:
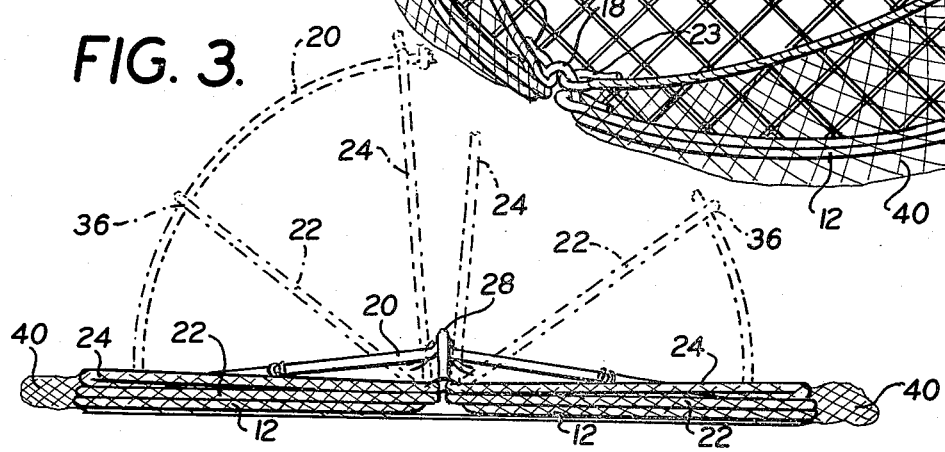
FIG. 3 is a side view of the trap shown in FIG. 1 shown open and lying flat and also showing, in phantom, the relative position of the trap enclosure forming members when erected to form the trap enclosure.

As shown in FIG. 3, the arcuate member 20 and the frame members 22, 24 are adapted to lie flat with the base 10 when the trap is open, the pairs of frame members 22, 24 lying flat on opposite sides of the base.

Pull rope 30 with end members 31 serves as an actuation device. The two ends 31 pass through eyelet 28 of the arcuate member 20 and are attached to centrally located eyelets 26 on the two frame members 24. Slidable guides 32 on the arcuate member 20 help to maintain the rope ends 31 in a position conforming to the perimeter of the trap when it is open. Guide members 32 are prevented from sliding all the way down on the arcuate member 20 by means of stop members 34 on the arcuate member 20.

Opposite frame members 24 are adapted to pivot to a generally upright position, while the other opposite frame members 22 are adaped to pivot to an intermediate position between the upright frame members 24 and the base 10 in forming the trap enclosure. For example, the frame members 22 can form an angle of 45° with the base 10.

The flexible and foldable net 40 is attached to the perimeter of the base 10 generally in the area of the frame member 12. The net 40 is also attached along the opposite frame members 24. The intermediate frame members 22 are attached to the net 40 at the desired intermediate position. This is shown by reference numeral 36 in the drawing.

Figure 2:
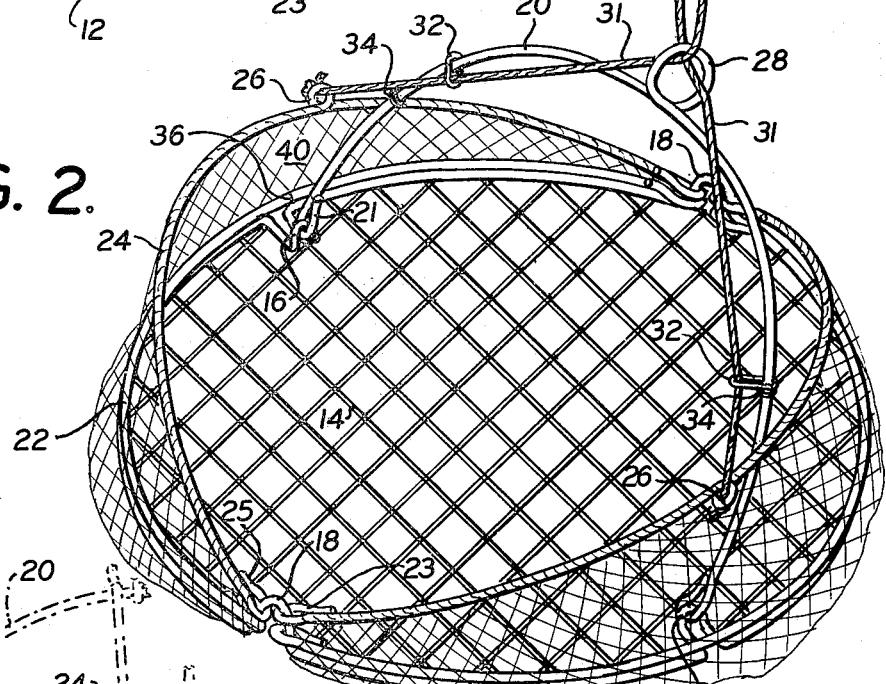
FIG. 2 is also a perspective view of the trap of the invention shown generally open with the trap enclosure forming members beginning to come to the erected position to form the trap enclosure.

In operation, the trap in the open and baited position with the arcuate member 20 and the opposite frame members 22, 24 lying flat and generally conforming to the outline of the base, is erected to form a trap closure as follows: upward movement of the rope 30 and the rope ends 31 causes the arcuate member 20 to pivot from its flat position against the base 10 to an upright position as shown in FIGS. 1 and 3 of the drawing. FIG. 2 of the drawing shows the arcuate member 20 in the process of pivoting to the upright position from its flat position against the base when the trap is open. The rope ends 31 pass through the centrally positioned eyelet 28 of the arcuate member 20 and upward motion of the rope 30 causes the arcuate member 20 to pivot upwards to an upright position by virtue of rope ends 31 being attached to the opposite frame members 24 at points 26. When and as the arcuate member 20 pivots to the upward position; the opposite frame members 22, 24, carrying the flexible and foldable net 40, also pivot upwards from their normally flat position against the base and come towards each other over the upright arcuate member 20 thereby forming the trap enclosure with a base as shown in FIG. 1 of the drawing. In practice, the two frame members 24 come towards and abut against each other in forming the trap enclosure, while the two frame members 22 come to an intermediate position as shown.

It should be noted that arcuate member 20 can fall either way to lie flat against the frame member 12. However, the trap is characterised by an important feature whereby the arcuate member 20 will fall toward the direction from which the trap is thrown which prevents the rope 30 from lying across the baited base 40. Thus, when the trap is erected by actuation of the rope 30, the trap enclosure is rapidly formed without interfering with the quarry enclosed in the trap. This feature ensures 100% visibility and trouble-free operation. In other words, the arcuate member 20 is adapted to pivot from its erected upright position to its flat position against the frame member 12 toward the direction from which the trap is thrown thereby preventing the pull rope 30 from falling across the base member 40 which might otherwise interfere with a quarry in the trap.

The collapsible trap of the invention can be fabricated using conventional techniques from conventional materials of construction. For example, the base of the trap and the enclosure forming members can be made of metal such as steel or other rust resistant metals, while the net 40 can be made of cotton or more corosion resistant synthetic fibers, such as Dacron, Nylon and the like. While the arcuate member 20 and the frame members 22, 24 are preferably made of metal, the base 10 can be constructed of plastic or a combination of, for example, a metal frame and a plastic perforate base for the member 14.

The net 40 can be attached to the perimeter of the base and the respective frame members 22, 24 by mechanical means, such as by tying or twisted wire means or, depending on the material of construction, it can be heat sealed to itself around the perimeter of the base and the frame members 22, 24.

Various modifications and alterations can be made in the collapsible trap of the invention without departing from the spirit and scope of the invention described herein. For example, one-half of the trap can be fixed in the erected position and the other half of the trap can be adapted to be spring-closed by a spring triggered actuation device which would be activated by a quarry going at the bait in the trap.

What is claimed is:

1. Collapsible trap comprising a base, arcuate means extending across the base and pivotably mounted thereon, two frame means each carrying net means extending across said base at generally right angles to the arcuate means and also being pivotably mounted on said base, said arcuate means and said frame means being adapted to lie flat with said base when the trap is open, said frame means lying flat on opposite sides of the said base, and actuation means adapted to cause the arcuate means to pivot to an upright position and said net and frame means to pivot upwards from said base towards each other over said upright arcuate means and form a trap enclosure with said base.

2. Trap of claim 1 wherein said arcuate means has a centrally positioned eyelet and the actuation means is a pull rope which passes through said eyelet, said pull rope having two ends, one each attached to each of the frame means whereby upward motion of the rope causes the arcuate means to pivot to an upright position and upward pivotal movement of the net and frame means towards each other and over said upright arcuate means.

3. Trap of claim 1 wherein said two frame means each includes a pair of frame members, one of which is adapted to pivot to an upright position and the other to an intermediate position between the upright frame member and the base in forming the trap enclosure.

4. Trap of claim 2 including slidable guide means on the arcuate means for each of the rope ends.

5. Trap of claim 1 wherein said base is generally circular and said arcuate and frame means are semicircular in shape and generally conform to the outline of the base when lying flat thereon.

* * * * *